United States Patent
Lenard et al.

(12) 
(10) Patent No.: US 8,284,676 B1
(45) Date of Patent: Oct. 9, 2012

(54) USING MEASUREMENTS FROM REAL CALLS TO REDUCE THE NUMBER OF TEST CALLS FOR NETWORK TESTING

(75) Inventors: Rohan Lenard, Birchgrove (AU); Michael J. Thomas, Denver, CO (US); Bradley Williams, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 1145 days.

(21) Appl. No.: 11/861,799

(22) Filed: Sep. 26, 2007

Related U.S. Application Data

(63) Continuation-in-part of application No. 11/715,753, filed on Mar. 8, 2007, now abandoned.

(51) Int. Cl.
 *H04J 1/16* (2006.01)
(52) U.S. Cl. .................................. 370/241; 370/248
(58) Field of Classification Search .................. 370/241, 370/241.1, 242, 243, 244, 245, 247, 248, 370/249, 351, 216, 217, 218; 379/1.01, 1.02, 379/1.03, 1.04, 22.02
 See application file for complete search history.

(56) References Cited

U.S. PATENT DOCUMENTS

2007/0019559 A1 * 1/2007 Pittelli et al. .................. 370/248

OTHER PUBLICATIONS

Scalable network assessment for IP telephony by Karacali et al. Jun. 2004.*
Viola Networks, "Viola Networks Releases NetAlly Lifecycle Manager version 5.2", www.violanetworks.com/print.php/sid/5/aid/16/nid/64/sitetype/Viola, Apr. 17, 2007, 3 pp., Viola Networks.
NIMSOFT, "NimBUS for Cisco VoIP Monitoring", Data Sheet, www.nimsoft.com, 2006, 2 pp., Nimsoft Inc.
GL Communications, "VQuadTM—Voice Quality Testing Across All Networks", www.gl.com/vquad.html, 5 pp., GL Communications Inc.
GL Communications, "RTP ToolBoxTM (RTP Simulation Tool)", 4 pp., GL Communications Inc.

* cited by examiner

*Primary Examiner* — Kibrom T Hailu
*Assistant Examiner* — Dady Chery

(57) ABSTRACT

In a network diagnostics system, network topology discovery determines the links that make up the network, artificial call quality management determines the set of test calls that need to be made to test the network, and real call quality management collects call-quality data about real calls in the network. The set of test calls is reduced by calls that would duplicate paths, or portions of paths, of the real calls, and artificial call quality management performs only the test calls of the reduced set and collects call-quality data thereon. Analysis analyzes the combined data of the real calls and the test calls to determine the possibly-bad call paths in the network.

19 Claims, 3 Drawing Sheets

USING MEASUREMENTS FROM REAL CALLS TO REDUCE THE NUMBER OF TEST CALLS FOR NETWORK TESTING

CROSS-REFERENCE TO RELATED APPLICATIONS

This application is a continuation-in-part of prior application Ser. No. 11/715,753 filed on Mar. 8, 2007 now abandoned.

TECHNICAL FIELD

This invention relates to diagnostics of communications networks.

BACKGROUND OF THE INVENTION

Various tools exist for identifying locations in communications networks that are causing performance problems, such as communication Quality of Service (QoS) problems. An illustrative example thereof is the "Blame Expert" tool of Avaya Inc. that is described in U.S. Pub. No. US 2005/0053009. Like other tools of its kind, the Blame Expert tool analyzes network traffic measurements and network topology information to identify potentially-faulty links in the network as a whole.

Tools that actively test a network introduce traffic into the network to run the tests. One such tool is the ExpertNet™ VoIP quality management tool, a.k.a. EQM, of Avaya Inc. This tool simulates VoIP calls in a customer's network and collects quality-of-service measurements on those test calls. However, network managers are sensitive to the amount of traffic that such tools add to the network, and they want to minimize the amount of test traffic so that users are not affected by reduced network bandwidth and network congestion.

Some algorithms and means of displaying data require "snapshots" of a network, and they need to collect as much data as possible in a short time. For instance, the abovementioned Blame Expert tool which attempts to pinpoint problems in a network, requires that all test calls finish within 5 minutes. The Blame Expert tool works best when it has the results for many test calls, but system and network resources constrain the number of test calls that can reasonably be made.

SUMMARY OF THE INVENTION

This invention is directed to solving these and other problems and disadvantages of the prior art. According to the invention, measurements made on real calls in a network are used to reduce the number of test, artificial, calls that need to be made in the network to properly test the network.

According to an aspect of the invention, call-quality data is obtained about real calls that have call paths in a communications network, a set of test calls is determined that have call paths that would test the communications network, the set of the test calls is reduced by those test calls whose call paths are overlapped, covered, by the call paths of ones of the real calls, the test calls of the reduced set are performed and call-quality data is obtained about the performed test calls, and the call-quality data about the test calls and about the real calls is analyzed to determine possibly-bad paths in the network. Advantageously, by reducing the number of test calls and instead using the data collected on the real calls, the bandwidth consumed by the test calls is reduced. Also, either the time needed to run the requisite test calls is reduced or the portion of the network that can be adequately tested via the limited number of test calls that can be made in a given time period is increased.

The invention may be implemented as a method, an apparatus for performing the method, or a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
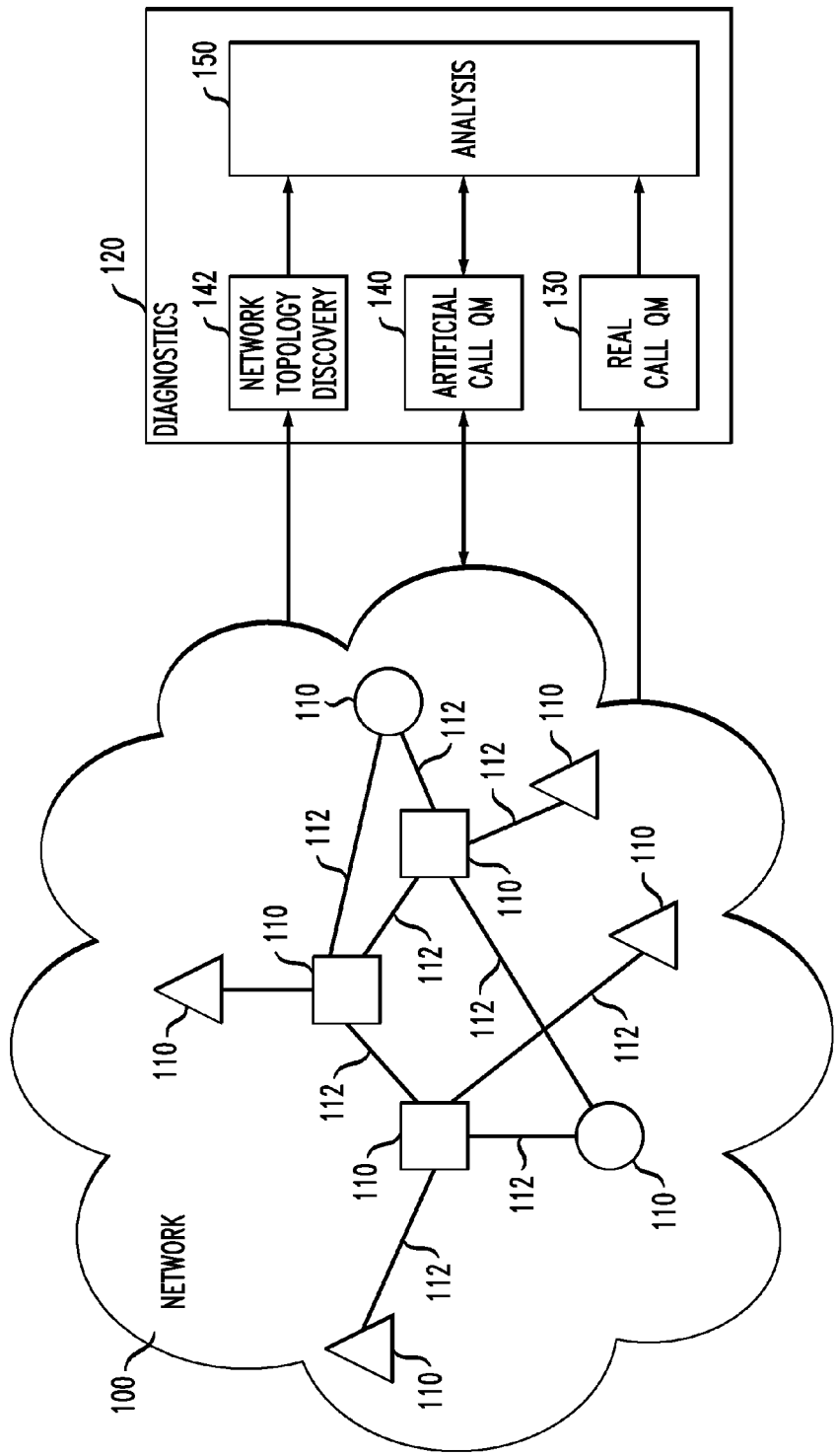
FIG. 1 is a block diagram of a VoIP communications system that includes an illustrative embodiment of the invention.

FIG. 1 shows an example of a communications system that includes an illustrative embodiment of the invention. In this illustrative example, the system of FIG. 1 is a Voice over Internet Protocol (VoIP) system. It includes a packet communications network 100 comprising a plurality of entities 110, such as user terminals and other endpoint devices, routers, gateways, servers, etc., interconnected by communications links 112, such as wired and wireless links, optical links, multiplexed switched links, etc. Connected to network 100 is a network diagnostics system 120. As described so far, the communications system of FIG. 1 is conventional.

Diagnostics system 120 comprises network topology-discovery system 142, a artificial-call-based quality management (QM) system 140, and a real-call-based QM system 130, all of which are connected to network 100, and an analysis system 150 that is connected to systems 130, 140, and 142. Illustratively, diagnostics system 120 comprises a computer that includes a computer-readable medium containing computer-executable instructions that implement systems 130, 140, and 142. Illustratively, artificial-call-based QM system 140 and topology discovery system 142 jointly constitute the ExpertNet™ VoIP quality management tool of Avaya Inc. The ExpertNet tool discovers network 100 by using the Simple Network Management Protocol (SNMP) and traceroute. It also injects Real-Time Transport Protocol (RTP) artificial (i.e., test) calls between endpoints into network 100 and monitors the quality and performance of these artificial calls by measuring their end-to-end packet delay, jitter, loss, and mean opinion score (MOS). It then provides extensive reporting and analysis outputs. The ExpertNet tool identifies network topology at the ISO OSI levels 1, 2, and 3. It is capable of identifying all links in network 100, where a link is a connection between two adjacent devices in network 100. However, the ExpertNet tool is not aware of the actual complete call paths of calls through network 100. Rather, it is only aware of packet flows between endpoints, and so it only has knowledge of the approximate call paths through network 100. The granularity at which the ExpertNet tool "sees" packet-flow paths is the level of path segments between network endpoints, where endpoints comprise terminal (network edge) devices and network routers. Other devices besides endpoints may exist in the network—gateways, for example. Therefore, a packet-flow path segment may comprise one or a plurality of links. The ExpertNet tool determines and reports QoS information on a per-call-path (end-to-end) basis, and not on a per-segment basis.

Illustratively, real-call-based QM system 130 is the VoIPStats tool of Avaya Inc. This tool remotely monitors and manages IP telephony performance by passively monitoring all customer (i.e., real) calls in network 100. It collects RTCP packets of RTP sessions running between IP telephony devices during a call, records the actual call path between the IP telephony devices, and measures network latency, jitter, and loss for each of the call paths. Unlike the ExpertNet tool, which is aware of call paths at the OSI layers 1, 2, and 3, VoIPStats is aware of, and reports on call paths, only at the OSI layer 3. Moreover, VoIPStats does not include a network topology discovery mechanism, and "sees" call paths only at the level of sessions between voice equipment, where voice equipment comprises user endpoints (telephones) and gateways. Other devices may exist in the network—routers, for example. Therefore, a session may comprise one or a plurality of links. VoIPStats determines and reports QoS information on a per-call-path (end-to-end) basis and on a per-session basis, but not on a per-link basis.

The outputs of systems 130, 140, and 142 are fed for further mathematical analysis to analysis system 150. Illustratively, system 150 includes the Blame Expert tool of Avaya Inc., which conventionally takes the measurements of delay, jitter, loss, and MOS determined by system 140 and attributes them to different segments of network 100 determined by system 142, to discover those segments of network 100 that may be causing QoS problems in network 100. The Blame Expert tool first notes which calls had bad QoS measurements, and it considers all of the segments of those calls' call paths as potentially being bad. It then notes which calls were good, and it considers all segments used by the call paths of good calls to be good. Then it subtracts the set of known good segments from the set of potentially-bad segments to obtain a set of segments that can potentially be "blamed" for problems in the network. From the discovered network topology, the Blame Expert tool knows which links make up the blameable segments, and hence it knows the set of blameable links. The Blame Expert tool is illustratively described in Pub. No. U.S. 2005/0053009, which is hereby incorporated herein in its entirety.

The Blame Expert tool can determine the possibly-bad links of an individual bad artificial (test) call. From the ExpertNet tool, it obtains the network topology—the links that make up network 100, the segments of bad artificial calls, and the segments of good artificial calls. Using the network topology data, the Blame Expert tool decomposes the segments of the individual bad artificial call into their constituent links. It then takes the union of the links of all of the bad artificial calls and subtracts therefrom the links of the good artificial calls to obtain a set of possibly-bad links, and takes the intersection of the set of possibly-bad links with the links of the individual bad artificial call to yield the possibly-bad links of the individual artificial call.

Illustratively, the Blame Expert tool operates on data obtained from both the ExpertNet and VoIPStats tools. From the ExpertNet tool, it knows the segments that make up the individual bad artificial call. From the VoIPStats tool, it obtains the sessions that make up a bad real call. Using the network topology data, the Blame Expert tool decomposes the obtained segments and sessions into their constituent links. It then takes the union of the links of all of the bad artificial calls and the links of the bad real call and subtracts therefrom the links of the good artificial calls to obtain a set of possibly bad links. It then takes the intersection of the set of possibly-bad links with the links of the bad real call to yield the possibly-bad links of the real call. This functionality is described in U.S. patent application Ser. No. 11/715,753 referenced above, which his hereby incorporated herein by reference in its entirety.

The term "call" as used herein is intended to be construed broadly so as to encompass traditional telephony, Internet telephony communications, VoIP communications, Session Initiation Protocol (SIP) communications, multimedia communications, or other types of network traffic in a network-based communications system.

Figure 2:
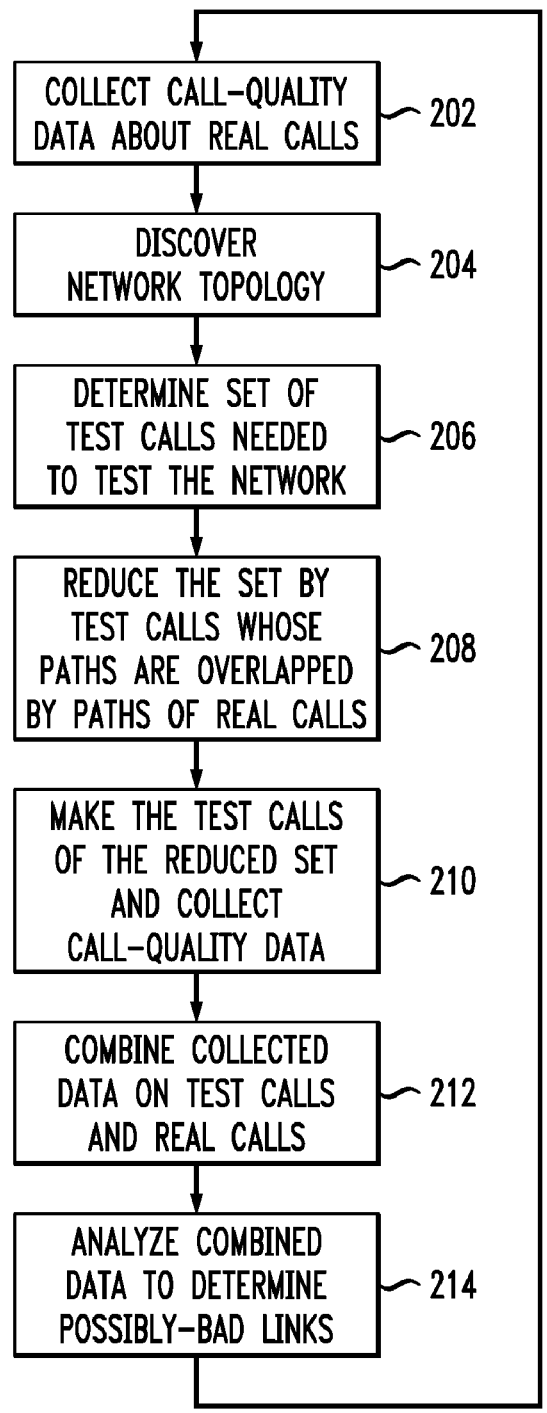
FIG. 2 is a functional-flow diagram of one illustrative example of the diagnostics of the system of FIG. 1.

FIG. 2 shows an illustrative example of the operation of diagnostics 120. Real call QM 130 constantly collects call-quality data about real calls, at step 202. The rest of diagnostics 120 is executed periodically, e.g., every five minutes. Upon starting the periodic execution of diagnostics 120, network topology discovery 142 discovers the topology of network 100, at step 204. Synthetic call QM 140 then uses the topology to determine a full set of test calls that are needed to test network 100, at step 206. However, the topology of network 100 is not likely to change significantly very often, and so it is not necessary to execute steps 204 and 206 as often as the rest of diagnostics 120. For example, steps 204 and 206 may be executed only once every 24 hours; meanwhile, steps 204 and 206 reduce to merely retrieving from memory the full set of test calls that was determined the last time that steps 204 and 206 were executed. Alternatively, at step 206, analysis 150 may reduce the network topology by the call paths of the real calls that were made during the preceding period, and determine the set of test calls that would test the reduced topology. Or, at step 206, analysis 150 may determine, from the data about real calls that is gathered during each period, which portion of the network includes possibly-bad paths, and determines the full set of test calls needed to test that network portion. Analysis 150 then reduces the full set of test calls by any test calls whose call paths are overlapped by the call paths of real calls reported in the immediately-preceding (e.g., five-minute) period by real call QM 130, at step 208. For example, a real call that follows a call path made up of links A-B-C-D makes unnecessary a test call that follows a call path made up of links B-C-D. Alternatively, step 208 may be performed on a less-granular basis wherein analysis 150 reduces the full set by those test calls whose call paths comprise links that are included in the call paths of the real calls. Synthetic call QM 140 then makes only test calls that are left in the reduced set, and collects call-quality data thereon, at step 210. Analysis 150 combines the data collected on the test calls by synthetic call QM 140 with the data collected on the real calls by real call QM 130, at step 212, and analyzes the combined data (e.g., by executing the Blame Expert tool) to determine the possibly-bad links in network 120, at step 214. The instance of execution of diagnostics 120 then ends.

Figure 3:
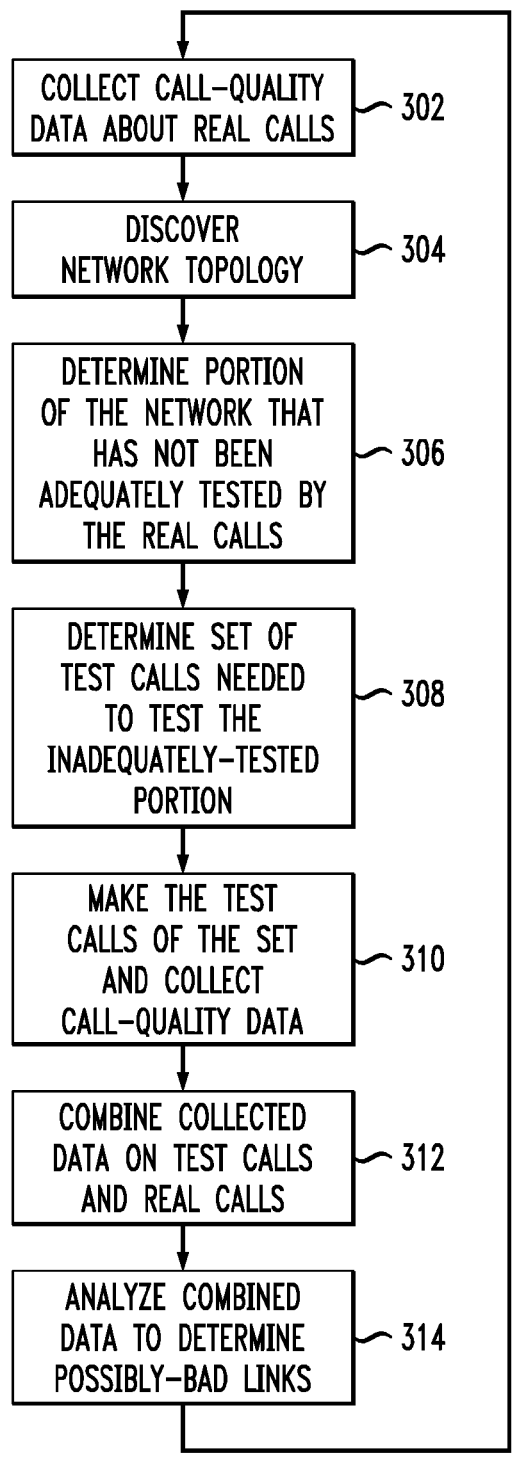
FIG. 3 is a functional-flow diagram of another illustrative example of the diagnostics of the system of FIG. 1.

FIG. 3 shows another illustrative example of operation of diagnostics 120. Once more, real call QM 130 constantly collects call-quality data about real calls, at step 302, while the rest of diagnostics 120 is executed periodically. Upon starting execution of the rest of diagnostics 120, network topology discovery 142 discovers the topology of network 100, at step 304. As was explained above in conjunction with FIG. 2, this step need not be performed as often as the rest of diagnostics 120; meanwhile, step 304 reduces to merely retrieving from memory the network topology that was determined the last time that step 304 was executed. Analysis 150 then uses reports of real calls that were provided by real call QM 130 to determine which portions of network 120 have been adequately tested by the real calls, at step 306. Analysis 150 provides this information to synthetic call QM 140, which then determines the set of test calls that are needed to test those portions of network 100 that have not been adequately tested by the real calls, at step 308. Synthetic call QM 140 then makes only the test calls in the set and collects QM data thereon, at step 310. Analysis 150 combines the data collected on the test calls by synthetic call QM 140 with the QM data collected on the real calls by real call QM 130, at step 312, and calculates blame therefrom, at step 314. The instance of execution of diagnostics 120 then ends. Of course, various changes and modifications to the illustrative embodiment described above will be apparent to those skilled in the art. For example, one may use real calls to pinpoint troublesome network links or network "zones", and only run test calls in those troublesome areas to pinpoint problem links via more-granular blame attribution. Or, one may keep constant track of link coverage by real calls and have the Blame tool do best-effort assessment based on real-call results, only injecting test calls to test those links or network "zones" that have not been covered by real calls for a threshold amount of time. Thus, bandwidth-intensive test calls and comprehensive Blame are applied to the entire network only periodically. Or, one may generate test calls and run the Blame tool intermittently, and use negative results to trigger more-comprehensive and longer-running tests (either with test calls only or with test and real call combinations). Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   obtaining call-quality data about real calls having call paths in a communications network;
   determining a set of test calls having call paths that would test the network;
   reducing the set of the test calls by those test calls whose call paths duplicate the call paths of ones of the real calls;
   performing the test calls of only the reduced set and obtaining call-quality data about the performed test calls; and
   analyzing the call-quality data about the test calls and about the real calls to determine possibly-bad paths in the network.

2. The method of claim 1 wherein:
   each call path comprises at least one link; and
   reducing comprises
   reducing the set of the test calls by those test calls whose call paths comprise links that are included in the call paths of the real calls.

3. The method of claim 1 wherein:
   determining comprises
   determining, from the call quality data about the real calls, which portion of the network includes possibly-bad paths; and
   determining a set of test calls having call paths that would test the portion of the network that includes the possibly-bad paths.

4. The method of claim 1 wherein:
   determining comprises
   obtaining a topology of the communications network,
   reducing the topology by the call paths of the real calls, and
   determining a set of test calls having call paths that would test the reduced topology of the communications network.

5. The method of claim 1 wherein:
   reducing comprises
   determining a portion of the communications network that is not adequately tested by the real calls;
   determining comprises
   determining a subset of test calls having call paths that would test the portion of the communications network; and
   performing comprises
   performing the test calls of the subset and obtaining call-quality data about the performed test calls.

6. The method of claim 5 wherein:
   each call path comprises at least one link; and
   determining a subset comprises
   determining the subset, and
   for first test calls of the subset whose call paths include links of call paths of the real calls, substituting in the subset second test calls whose call paths exclude links of call paths of the real calls.

7. A non-transitory computer-readable medium containing instructions which, when executed by a computer, cause the computer to perform the method of one of the claims 1-6.

8. A diagnostics apparatus comprising:
   means for obtaining call-quality data about real calls having call paths in a communications network;
   means for determining a set of test calls having call paths that would test the communications network;
   means for reducing the set of the test calls by those test calls whose call paths duplicate the call paths of ones of the real calls;
   means for performing the test calls of only the reduced set and obtaining call-quality data about the performed test calls; and
   means for analyzing the call-quality data about the test calls and about the real calls to determine possibly-bad paths in the network.

9. The apparatus of claim 8 wherein:
   each call path comprises at least one link; and
   the means for reducing is adapted to reduce the set of the test calls by those test calls whose call paths comprise links that are included in the call paths of the real calls.

10. The apparatus of claim 8 wherein:
    the means for determining comprises
    means for determining, from the call quality data about the real calls, which portion of the network includes possibly-bad paths; and
    means for determining a set of test calls having call paths that would test the portion of the network that includes the possibly-bad paths.

11. The apparatus of claim 8 wherein:
    the means for determining comprises
    means for obtaining a topology of the communications network,
    means for reducing the topology by the call paths of the real calls, and
    means for determining a set of test calls having call paths that would test the reduced topology of the communications network.

12. The apparatus of claim 8 wherein:
    the means for reducing is adapted to determine a portion of the communications network that is not adequately tested by the real calls;
    the means for determining is adapted to determine a subset of test calls having call paths that would test the portion of the communications network; and the means for performing is adapted to perform the test calls of the subset and obtain call-quality data about the performed test calls.

13. The apparatus of claim 12 wherein:

each call path comprises at least one link; and the means for determining a subset is adapted to determine the subset, and for first test calls of the subset whose call paths include links of call paths of the real calls, to substitute in the subset second test calls whose call paths exclude links of call paths of the real calls.

14. A diagnostics apparatus comprising:

a real-call quality management system for obtaining call-quality data about real calls having call paths in a communications network;

at least one of a test-call quality management system and an analysis system for determining a set of test calls having call paths that would test the communications network, and for reducing the set of the test calls by those test calls whose call paths duplicate the call path of ones of the real calls, the test-call quality management system further for performing the test calls of only the reduced set and obtaining call quality data about the performed test calls; and the analysis system further for analyzing the call-quality data about the test calls and about the real calls to determine possibly-bad paths in the network.

15. The apparatus of claim 14 wherein:

each call path comprises at least one link; and the at least one of the test-call quality management system and the analysis system is adapted to reduce the set of the test calls by those test calls whose call paths comprise links that are included in the call paths of the real calls.

16. The apparatus of claim 14 wherein:

the at least one of the test-call quality management system and the analysis system is adapted to determine, from the call quality data about the real calls, which portion of the network includes possibly-bad paths, and to determine a set of test calls having call paths that would test the portion of the network that includes the possibly-bad paths.

17. The apparatus of claim 14 further comprising:

a network topology discovery system for obtaining a topology of the communications network, wherein the at least one of the test-call quality management system and the analysis system is adapted to reduce the topology by the call paths of the real calls, and to determine a set of test calls having call paths that would test the reduced topology of the communications network.

18. The apparatus of claim 14 wherein:

the at least one of the test-call quality management system and the analysis system is adapted to determine a portion of the communications network that is not adequately tested by the real calls, and to determine a subset of test calls having call paths that would test the portion of the communications network; and the test-call quality management system is adapted to perform the test calls of the subset and to obtain call-quality data about the performed test calls.

19. The apparatus of claim 18 wherein:

each call path comprises at least one link; and the at least one of the test-call quality management system and the analysis system is adapted to determine the subset, and for first test calls of the subset whose call paths include links of call paths of the real calls, to substitute in the subset second test calls whose call paths exclude links of call paths of the real calls.

* * * * *